(12) United States Patent
Mori et al.

(10) Patent No.: US 6,175,800 B1
(45) Date of Patent: Jan. 16, 2001

(54) ROUTE SEARCHING DEVICE

(75) Inventors: Takashi Mori, Fujisawa; Masatsugu Deshimaru, Ebina; Hiroshi Maruyama, Hachioji, all of (JP)

(73) Assignee: Xanavi Informatics Corporation (JP)

( * ) Notice: Under 35 U.S.C. 154(b), the term of this patent shall be extended for 0 days.

(21) Appl. No.: 09/296,067

(22) Filed: Apr. 21, 1999

(30) Foreign Application Priority Data

Apr. 22, 1998 (JP) .................................................. 10-111982

(51) Int. Cl.[7] .......................... G06F 165/00; G01C 21/00
(52) U.S. Cl. ............................... 701/202; 701/25; 701/35; 701/201; 701/208; 701/209; 340/995
(58) Field of Search ................................... 701/202, 209, 701/200, 208, 201, 211; 340/995

(56) References Cited

U.S. PATENT DOCUMENTS

| | | | |
|---|---|---|---|
| 4,951,212 | 8/1990 | Kurihara et al. | 369/449 |
| 5,191,532 * | 3/1993 | Moroto et al. | 701/201 |
| 5,452,212 * | 9/1995 | Yokoyama et al. | 701/211 |
| 5,528,501 * | 6/1996 | Hanson | 701/200 |
| 5,802,492 * | 9/1998 | DeLorme et al. | 455/456 |
| 5,864,831 * | 1/1999 | Schuessler | 705/417 |
| 5,867,110 * | 2/1999 | Naito et al. | 340/995 |
| 5,884,218 * | 3/1999 | Nimura et al. | 701/208 |
| 5,905,451 * | 5/1999 | Sakashita | 340/988 |
| 5,928,308 * | 7/1999 | Nanba et al. | 701/211 |
| 5,938,718 * | 8/1999 | Morimoto et al. | 701/201 |
| 5,944,768 * | 8/1999 | Ito et al. | 701/200 |
| 5,977,885 * | 11/1999 | Watanabe | 340/995 |
| 5,978,733 * | 11/1999 | Deshimaru et al. | 701/209 |
| 6,009,403 * | 12/1999 | Sato | 705/6 |
| 6,014,090 * | 1/2000 | Rosen et al. | 340/905 |
| 6,038,508 * | 3/2000 | Maekawa et al. | 701/207 |
| 6,049,753 * | 4/2000 | Nimura | 701/201 |
| 6,061,630 * | 5/2000 | Walgers et al. | 701/210 |

FOREIGN PATENT DOCUMENTS

| | | | |
|---|---|---|---|
| 0 588 082 A1 | 3/1994 | (EP) | G08G/1/0969 |
| 0 785 537 A1 | 7/1997 | (EP) | G09B/29/00 |

* cited by examiner

Primary Examiner—William A. Cuchlinski, Jr.
Assistant Examiner—Olga Hernandez
(74) Attorney, Agent, or Firm—Pennie & Edmonds LLP

(57) ABSTRACT

A route along which a user can use facilities set as stopovers is searched; when the user sets facilities relevant to a toll road as a stopover of a route to a destination, only links of toll roads around the facilities are set as target links, and a route passing via nodes of links in the neighborhood of the facilities is searched by a processor.

5 Claims, 5 Drawing Sheets

| FACILITY NAME | FACILITY COORDINATE | FACILITY TYPE | CONNECTION LINK INFORMATION |
|---|---|---|---|
| YOKOHAMA MUNICIPAL LIBRARY | (*,*) | LIBRARY | |
| **GS | (*,*) | GASOLINE STATION | LINK NUMBER |
| **RESTAURANT | (*,*) | RESTAURANT | LINK NUMBER |
| UP ENTRANCE OF TOMEI ATSUGI | (*,*) | ENTRANCE RAMP | |
| DOWN EXIT OF TOMEI ATSUGI | | EXIT RAMP | |
| ..... | ..... | ..... | ..... |

# ROUTE SEARCHING DEVICE

BACKGROUND OF THE INVENTION

1. Field of the Invention

The present invention relates to a technique for searching a route to a destination, extending via a place selected by a user, in a navigation apparatus mounted in a vehicle, etc.

2. Description of Related Art

With respect to a navigation apparatus mounted in a vehicle, a technique of searching a route extending from a departure place to a destination on the basis of road map data and suggesting the route thus searched as a recommendable route to a user has been put into practice.

Further, there has also been put into practice such a technique of accepting user's selection of one or plural stopovers and a destination from a plurality of stopover candidates and destination candidates which are prepared in advance in a route searching operation, and then searching a route extending from a departure place to the destination by way of each of the selected stopovers. Here, "stopover" means a place through which a route from a departure place to a destination necessarily passes. The stopover candidates and the destination candidates are various frequently prepared abilities which may generally be used by users, for example, sights, parking places, service areas, gasoline service stations, etc.

Since there are cases where stopovers and destinations thus selected are not located on roads, the following method has been hitherto adopted in order to determine a route extending from a departure place through stopovers to a destination. That is, a route extending from the departure place to an intersection/branching point of a road nearest to the facilities selected as a first stopover is searched, and then a route from the intersection/branching point to an intersection/branching point of a road nearest to the facilities selected as a next stopover is searched. This processing is repeated until a route to the final stopover is searched. Finally, a route extending from the final stopover to an intersection/branching point nearest to the destination is searched.

The operation of searching a route between places on a road is performed by a technique referred to as the Dijkstra's algorithm. According to this method, a route having the minimum cost is searched from available routes between places. The total distance of the route is frequently used as the "cost" of the route.

SUMMARY OF THE INVENTION

The conventional technique of searching the route from the departure place through each selected stopover to the destination has the following problem.

For example, there is now considered such a case that a service area attached to a toll road is selected as a stopover. In this case, according to the conventional technique, a route passing through a road nearest to the service area is searched. Therefore, when a public road which is not linked to the service area exists in the neighborhood of the service area, a route passing through the public road (not the toll road) is searched. In this case, the route passing through the public road which is not linked to the service area is searched in spite of the user's intention of selecting the service area as a stopover to use the service area, and thus the user cannot use the service area in this route. Therefore, according to the conventional technique, a route which does not meet the user's intention is searched.

Therefore, the present invention has an object to search a route which conforms more to a user's wishes in consideration of a selected stopover.

In order to attain the above object, a route searching device for searching a route from a departure place to a destination according to the present invention includes: means for accepting an indication of facilities serving as a stopover or a destination in a route to be searched by a user; and search means for searching a route from a departure place to a destination in which a place in the neighborhood of the indicated facilities on a road whose type is determined according to the type of the indicated facilities is set as a place on the route.

According to the route searching device described above, when a user indicates facilities relevant to the toll road as a stopover or destination, a route passing through the toll road of roads in the neighborhood of the facilities is searched by associating the toll road with the type of facilities relevant to the toll road, such as a service area or an interchange ramp, etc. Therefore, searching of a route which the facilities relevant to the toll road indicated by the user are unusable is avoided.

BRIEF DESCRIPTION OF THE DRAWINGS

FIG. 3 is a diagram showing the constitution of guide information according to the embodiment of the present invention;

DETAILED DESCRIPTION OF THE PREFERRED EMBODIMENT

A preferred embodiment of a route searching device according to the present invention will be described using a case where the present invention is applied to a vehicle mount type navigation apparatus.

Figure 1:
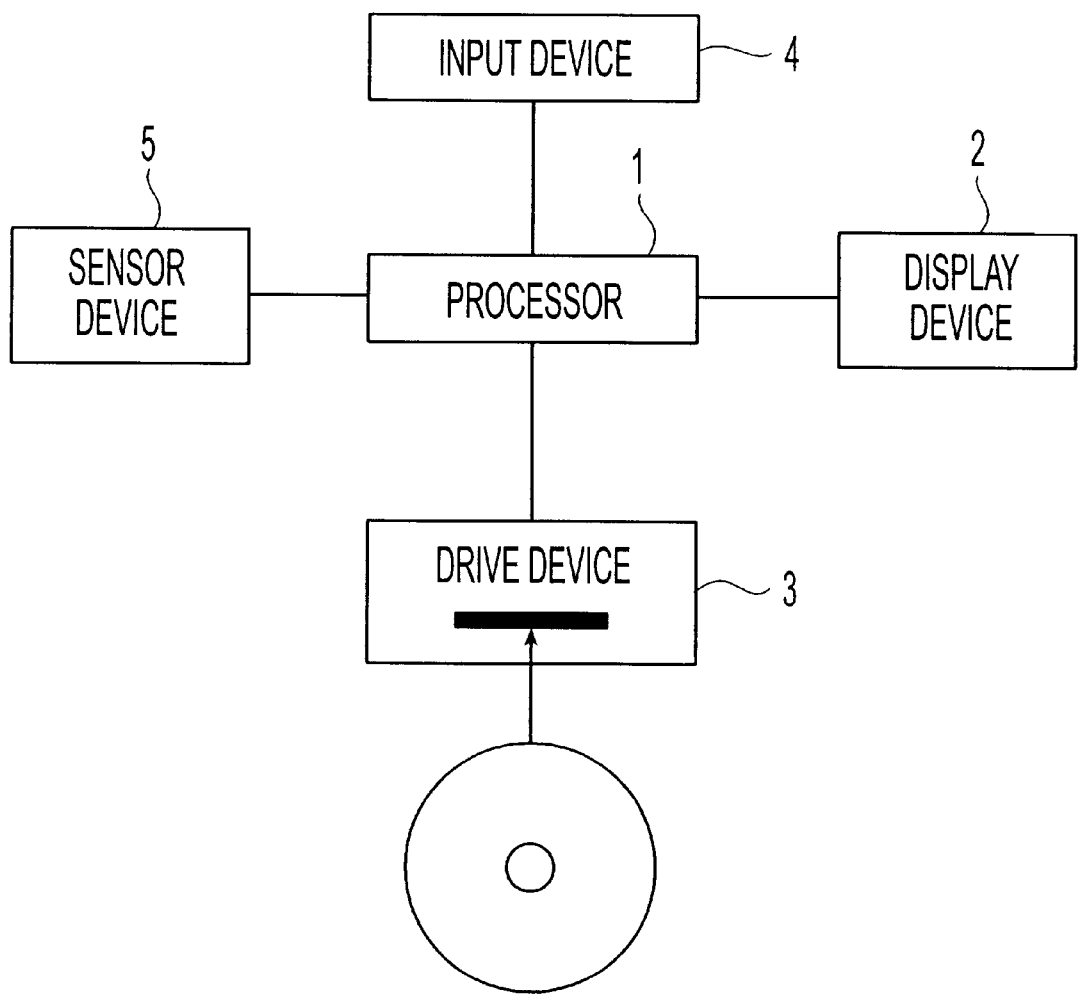
FIG. 1 is a block diagram showing the constitution of a navigation apparatus according to an embodiment of the present invention.

FIG. 1 shows the construction of a navigation apparatus according to an embodiment of the present invention.

In FIG. 1, reference numeral 1 represents a processor comprising a microprocessor and a memory, reference numeral 2 represents a display device, reference numeral 3 represents a drive device for accessing a storage medium such as CD-ROM or the like in which map data are stored, reference numeral 4 represents an input device for accepting an instruction input of a user, and reference numeral 5 represents a sensor device comprising a vehicle-speed sensor, an azimuth sensor, a GPS receiver, etc.

In this construction, the processor 1 calculates the current position of a vehicle on the basis of a travel azimuth of the vehicle input from the azimuth sensor of the sensor device 5, a vehicle speed input from the vehicle speed sensor of the sensor device 5 and the measured current position input from the GPS receiver of the sensor device 5, and also calculates a recommendable route to a destination on the basis of a destination input through the input device 4 by a user and the current position which is input through the input device 4 or calculated on the basis of an input from the sensor device 5.

On the basis of the calculated current position, the travel azimuth of the vehicle and the content indicated through the input device 4 by the user, the processor 1 controls the drive device 3 to read out the map data and display on the display device 2 a map represented by the map data concerned. The display of the map is carried out, for example, by displaying the map of an area around the calculated current position on a predetermined reduced scale, displaying the map of a section indicated by the user on a predetermined or indicated reduced scale, or displaying the map of an area containing a recommendable route from the current position to the destination on a proper reduced scale together with the recommendable route. At this time, marks representing the current position and travel azimuth of the vehicle are displayed on the map by being overlaid on the map.

Figure 2:
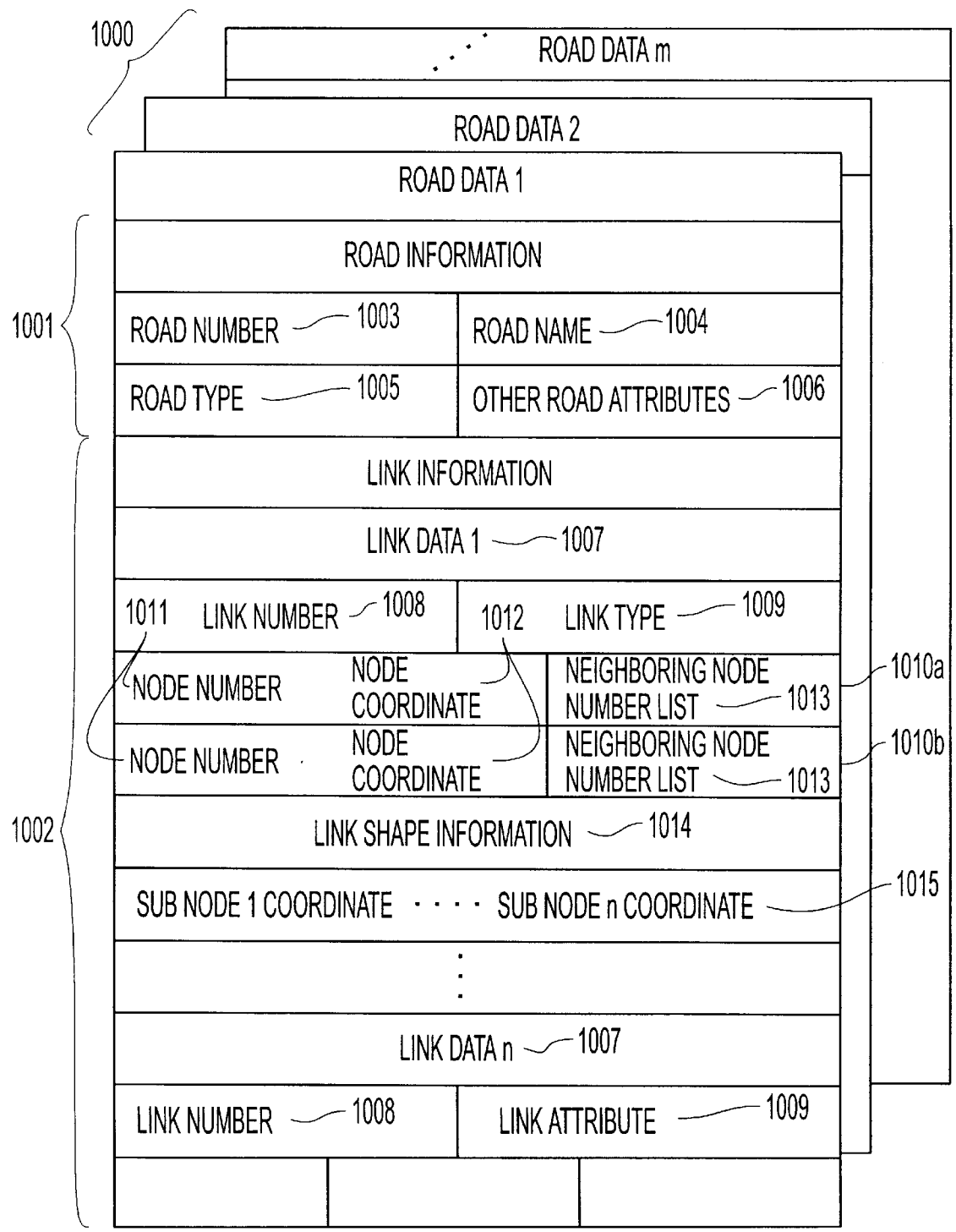
FIG. 2 is a diagram showing the constitution of map data according to the embodiment of the present invention.

FIG. 2 shows the map data recorded on a storage medium such as CD-ROM or the like which is mounted in the drive device 3.

As shown in FIG. 2, the map data comprises road data 1 to m 1000 each of which is provided every road. Each road data comprises road information 1001 and link information 1002.

The road information 1001 contains a road number 1003 representing a road uniquely, a road name 1004 representing the name of the road, a road type 1005 representing the type of the road (toll road, national highway, prefectural highway, ramp, etc.), and other attributes 1006 representing other road information.

The link information 1002 contains link data 1 to n 1008 representing information of links, each of which is provided for every link constituting a road. Here, "link" is a line segment with which the shape and position of a road is approximated.

Each link data 1007 contains a link number 1008 representing a link uniquely, and a link type 1009 representing the type of a road portion constructed by a link. Types as service areas/parking areas, interchange ramps, junctions or the like, and other proper types are provided as the link types 1009.

The link data 1009 contains, for two nodes 1010a, serving as 1010b both ends of the link concerned, a node number representing a node uniquely, a node coordinate representing the position of the node, and an neighboring node number list 1013 representing the node numbers of all the nodes which are linked to the node concerned through links. Here, the linkage of links is necessarily performed at a node. For example, at a crossroads, a node is provided at the center of the crossroads, and four links are linked to the node provided at the center. In this case, the node numbers of four nodes at the other ends of the four links which are linked to the node provided at the center are described in the neighboring node provided number list of the node at the center.

The link data 1009 also contains link shape information specifying the shape of the link. The link shape information 1004 comprises one or plural sub node coordinates 1015. For example when the number of sub node coordinates 1015 is equal to 2, the shape of the link is specified by successively linearly connecting a first node coordinate of the link, a first sub node coordinate, a second sub node coordinate and a second node coordinate of the link in this order.

FIG. 3 shows the construction of guide information recorded attendantly to the map data in a storage medium such as CD-ROM or the like which is mounted in the drive device 3.

As shown in FIG. 3, the guide information is a list of representative facilities existing in a geographical region covered by the map data, and the facility names 2001, the facility coordinates 2002 and the facility types 2003 for the respective facilities are described in the list. Here, the facility types 2003 contain not only various types of public facilities, sights, gasoline stations and restaurants, but also road-relevant facilities such as the entrance and exit ramps of toll roads, service areas/parking areas attendant to the toll roads, junctions of the toll roads, etc.

Further, link numbers for specifying links which are linked to the respective facilities (which are accessible by car to the facilities concerned) are described as connection link information 2004 in the guide information. A link specified by the connection link information 2004 is not necessarily a link linked to the facility which is directly indicated by the facility name, but it may be a link which is a facility relevant to the facility of the facility name. For example, when the facility indicated by the facility name is "○X department store", the link specified by the connection link information 2004 may be set as a link which is linked to the parking place of the department store concerned.

Next, the processing executed by the processor 1 will be described.

Figure 4:
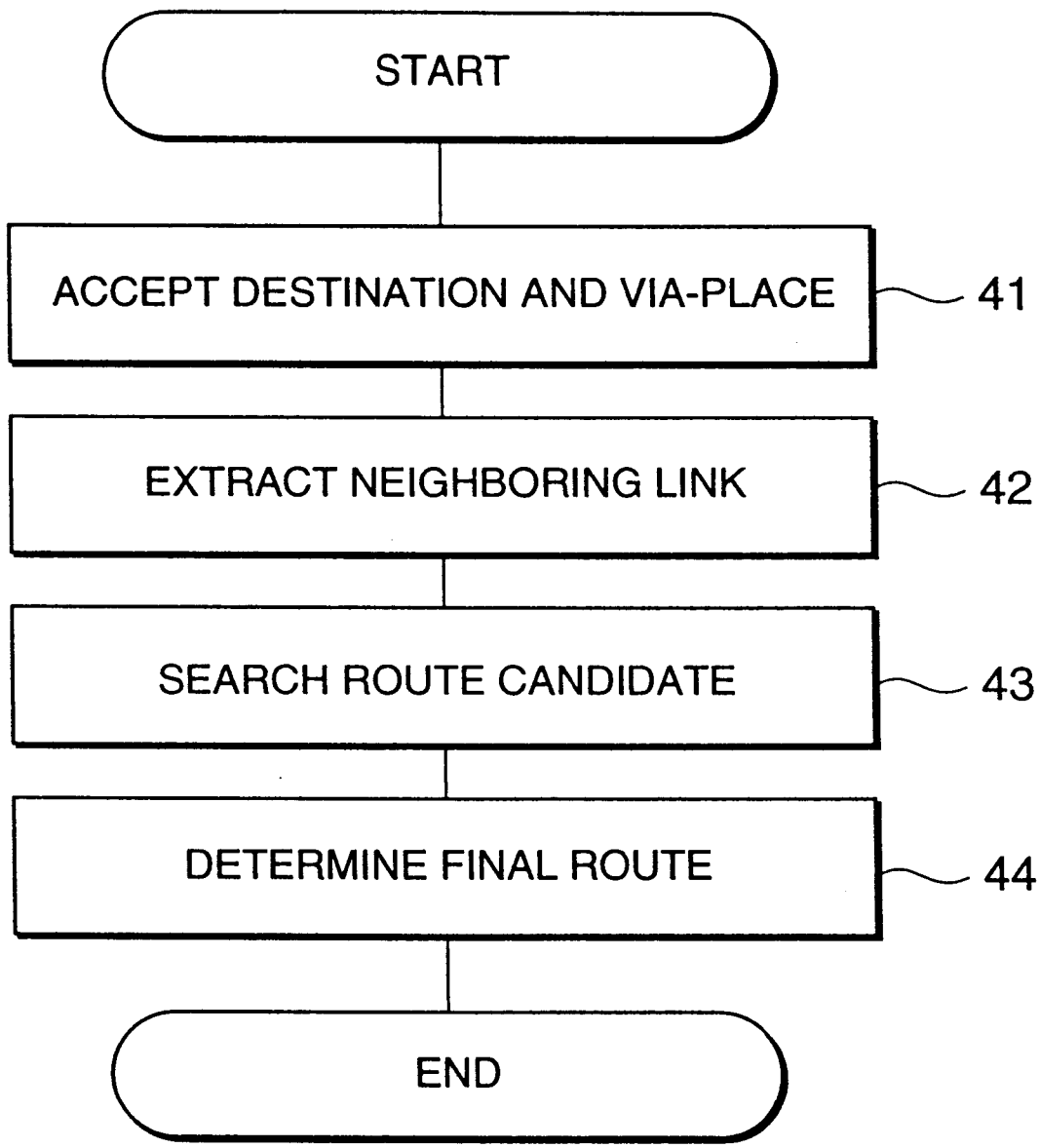
FIG. 4 is a flowchart showing the operation of the navigation apparatus according to the embodiment of the present invention.

FIG. 4 shows the procedure for this processing.

First, the processor 1 accepts and stores a destination and stopovers input by the user (step 41). The acceptance of the destination and the stopovers is carried out by displaying on the display device 2 the facility names of the respective facilities contained in the guide information recorded in the storage medium such as CD-ROM or the like which is mounted in the drive device 3, and accepting the facilities having the facility name selected by the user as the destination and the stopovers. Alternatively, when the coordinates of the destination and the stopovers are directly input by a pointing device or the like, the coordinates thus input are accepted as the destination and the stopovers.

Subsequently, with respect to each of the stopovers and the destination, the processor 1 executes the processing of extracting a link located in the neighborhood of the place concerned as a neighboring link (step 42).

Figure 5:
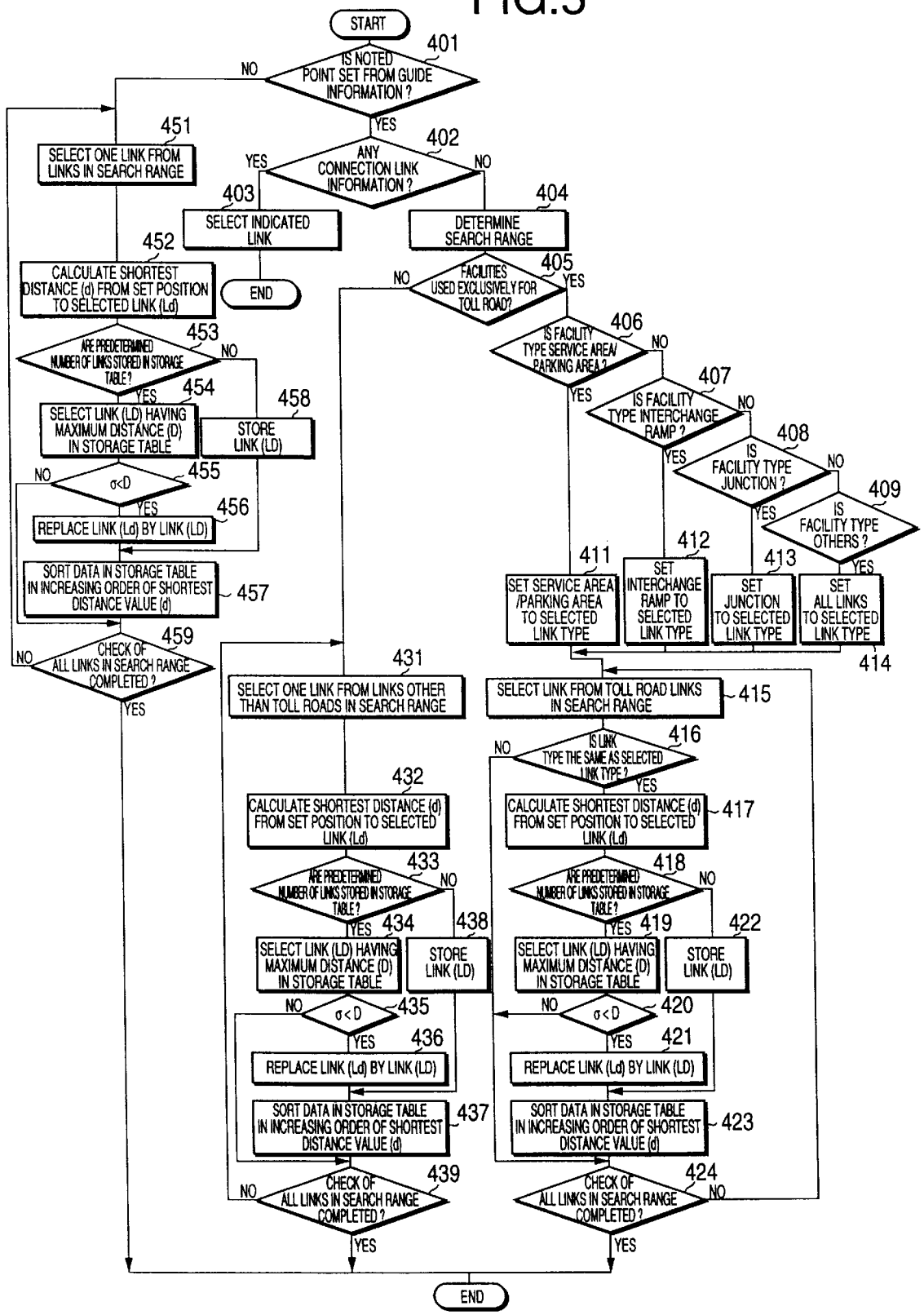
FIG. 5 is a flowchart showing the procedure of extracting a neighboring link in the embodiment of the present invention.

In this processing, each of the stopovers and the destination is successively set as a noted place, and the procedure of FIG. 5 is carried out on each noted place.

That is, it is judged whether a noted place is selected from the guide information of FIG. 3 or the coordinate of the noted place is directly indicated by the pointing device (step 401). If the coordinate of the noted place is directly indicated by the pointing device, a fixed search range containing the noted place at the center thereof is set, all the links of all the roads existing in the search range are set as candidate links, and a predetermined number of candidate links are selected as neighboring links of the noted place from the candidate links (step 451) in increasing order of the shortest distance to the noted place in consideration of the link shape (step 452 to 457).

More specifically, in the steps 452 to 457, each of the candidate links is successively noted, and if the shortest distance (step 452) of the noted link is smaller than the shortest distance (step 454) of the link having the maximum shortest distance which has been already stored in a storage table (step 455), the link having the maximum shortest distance is replaced by the noted link (step 456). In this case, a link which is noted under no condition is stored in the storage table (step 458) until a predetermined number of links are stored in the storage table (step 453).

When the noted place is one selected from the guide information, it is checked whether a link number is described in the connection link information of the guide information in association with the selected facilities which is the noted place (step 402). If it is described in the connection link information, the link having the link number concerned is extracted as a neighboring link of the noted place (step 403).

Further, if the noted place is one selected from the guide information and no link number is described in the connection link information of the guide information in association with the selected facilities which is the noted place, the facility coordinate which is described in the guide information in association with the selected facilities is referred to and a constant search range having the noted place at the center thereof is set (step 404).

Thereafter, the facility type which is described in the guide information in association with the selected facilities is checked to judge whether the facility type thereof is the type of facilities exclusively used for toll roads (step 405). In this case, when the facility type relates to facilities which are inherently attendant to the toll roads, such as an entrance ramp, an exit ramp, a service area/parking area, a junction or the like, the facility type concerned is judged to be the type of facilities exclusively used for toll roads. In the other cases, the facility type concerned is judged not to be the type of facilities exclusively used for toll roads.

If the facility type concerned is judged not to be the type of facilities exclusively used for toll roads, all the links of all the roads other than the toll roads existing in the search range are set as candidate links by referring to the map data (step 431), and a predetermined number of candidate links are successively extracted from the candidate links as neighboring links of the noted place in increasing order of the link-shape-based shortest distance to the sight (steps 432 to 437).

The details of the processing of the steps 432 to 437 are the same as the details of the steps 452 to 457.

On the other hand, if the facility type concerned is judged to be the type of facilities exclusively used for the toll roads, the selected link type is set (steps 411 to 414) according to the facility type (steps 406 to 409). In this case, if the facility type is an entrance or exit ramp, the interchange ramp is set as the selected link type. If the facility type is a service area/parking area, the service area/parking area is set as the selected link type. If the facility type is a junction, the junction is set as the selected link type. If the facility type is one of the other types, "no restriction" is set as the selected link type.

Thereafter, all the links of all the toll roads existing in the search range are set as candidate links (step 415), and links whose link type is coincident with the selected link type are selected from the candidate links as targets on the map data (step 416), and then a predetermined number of target links are successively extracted as neighboring links of the noted place from all the target links in increasing order of the link-shape-based shortest distance to the noted place (steps 416 to 423). Here, if the selected link type is "no restriction", all the links of all the toll roads existing in the search range are selected as targets. The details of steps 416 to 423 are the same as the details of steps 452 to 457.

Returning to FIG. 4, by referring to the map data, the processor 1 searches a candidate route for each of the sections which are sectioned by stopovers between a departure place to a destination (step 43).

In this case, for a section from the departure place to a first stopover, a plurality of routes, each of which extends from the departure place to a node (nearer to the first stopover) of each neighboring link which is extracted for the first stopover, are selected as a plurality of route candidates. Likewise, for a section from an i-th (i represents an integer from 1 to n−1) stopover to an (i+1)-th stopover, a plurality of routes, each of which extends from a node (nearer to the i-th stopover) of each neighboring link extracted for the i-th stopover to a node (nearer to the (i+1)-th stopover) of each neighboring link extracted from the (i+1)-th stopover in each of combinations comprising the respective neighboring links extracted for the i-th stopover and the respective neighboring links extracted for the (i+1)-th stopover are set as a plurality of route candidates. Further, for a section from an n-th stopover to the destination, a plurality of routes, each of which extends from a node (nearer to the n-th stopover) of each neighboring link extracted from the n-th stopover to a node (nearer to the destination) of each neighboring link extracted from the destination, are set as a plurality of route candidates each in combinations comprising the respective neighboring links extracted for the n-th stopover and the respective neighboring links extracted for the destination.

Subsequently, with respect to all the combinations obtained by selecting every route candidate for each section, the processor 1 carries out the processing of searching a route connecting route candidates selected for neighboring sections and then combining the route thus searched with the selected route candidates to generate a route extending from the departure place to the destination, thereby generating a plurality of routes from the departure place to the destination. Finally, a route having the lowest cost is selected from the routes thus generated and it is set as the final route from the departure place to the destination (step 44).

As described above, according to this embodiment, there is searched a route containing a node of a link whose link type meets the facility type of facilities set as a stopover or destination, the node being located in the neighborhood of the stopover or the destination. Therefore, when a user sets facilities relevant to a toll road as a stopover or destination, a route via a toll road located in the neighborhood of the stopover or destination is searched. Accordingly, searching a route along which the user cannot use the facilities set as a stopover or destination can be avoided, and thus a route which is more conformable to the user's intention can be searched.

Further, since the neighboring link is set by using the connection link information, a route along which the user can surely use facilities set as a stopover or destination can be searched, and thus a route which meets the user's intention can be searched.

The processor 1 of this embodiment may be a computer having a CPU, a memory and a proper OS, and in this case, each processing carried out by the processor 1 may be implemented by a CPU executing a program in which the procedure of each processing is described. In this case, these programs may be supplied to the processor 1 through a storage medium such as a CD-ROM or the like.

As described above, according to the present invention, the route which more meets the user's intention can be searched in consideration of selected stopovers.

What is claimed is:

1. A route searching device for searching a route from a departure place to a destination, comprising:
   means for storing a list containing facilities each of which can be indicated as a stopover or destination on the route to be searched by a user, at least one of the facilities being associated with a predetermined road;
   means for accepting a user's indication of a facility as the stopover or destination on the route to be searched; and search means for searching the route from the departure place to the destination in such a manner that when the facility indicated by the user is not associated with a predetermined road in the list, a place on a road in the neighborhood of the facility indicated by the user is set as a place on the route, and when the facility indicated by the user is associated with the predetermined road in the list, a place on the predetermined road in the neighborhood of the facility indicted by the user, is set as a place on the route.

2. A route searching device for searching a route from a departure place to a destination, comprising:

means for storing a list containing facilities each of which can be indicated as a stopover or destination on the route to be searched by a user, and each of which is associated with a type of facility;

means for accepting a user's indication of a facility as the stopover or destination on the route to be searched; and search means for searching the route from the departure place to the destination in such a manner that when a type of the facility indicated by the user in the list is not relevant to a predetermined type of roads, a place on a road in the neighborhood of the facility indicated by the user is set as a place on the route, and when the type of the facility indicated by the user in the list is relevant to the predetermined type of roads, a place on a road of the predetermined type of roads in the neighborhood of the facility indicated by the user is set as a place on the route.

3. A route searching device as claimed in claim 2, wherein said search means for searching the route from the departure place to the destination in such a manner that when the type of the facility indicated by the user in the list is not relevant to the toll roads, a place on a road other than the toll road in the neighborhood of the facility indicated by the user is set as a place on the route, and when the type of the facility indicated by the user in the list is relevant to the toll road, a place on the toll road in the neighborhood of the facility indicated by the user is set as a place on the route.

4. A method of searching a route from a departure place to a destination comprising:

a step of accepting a user's indication of a facility as a stopover or destination on the route to be searched; and a step of searching the route from the departure place to the destination in such a manner that when a type of the facility indicated by the user in the list is not relevant to the toll roads, a place on a road other than the toll road in the neighborhood of the facility indicated by the user is set as a place on the route, and when the type of the facility indicated by the user in the list is relevant to the toll road, a place on the toll road in the neighborhood of the facility indicated by the user is set as a place on the route.

5. A storage medium for storing a program which is read out and executed by a computer, wherein said program makes said computer execute a step of accepting a user's indication of a facility as a stopover or destination on a route from a departure place to a destination, and a step of searching the route from the departure place to the destination in such a manner that when the type of the facility indicated by the user is not relevant to the toll roads, a place on a road other than the toll road in the neighborhood of the facility indicated by the user is set as a place on the route, and when the type of the facility indicated by the user is relevant to the toll road, a place on the toll road in the neighborhood of the facility indicated by the user is set as a place on the route.

* * * * *